Jan. 5, 1932.  C. H. OISHEI  1,840,248
REAR VIEW MIRROR
Filed July 26, 1926
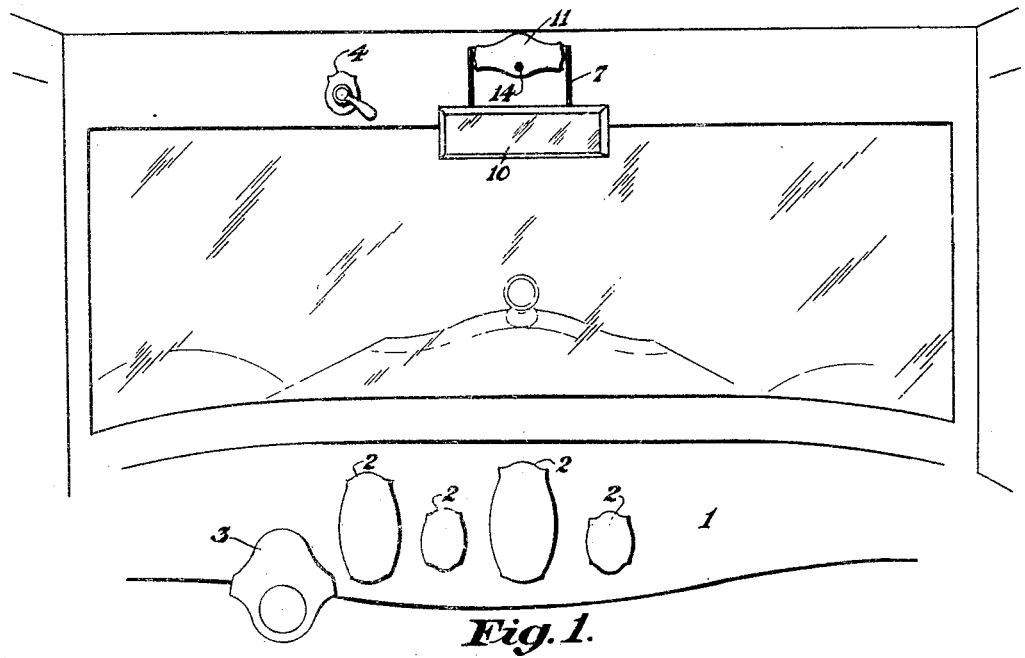
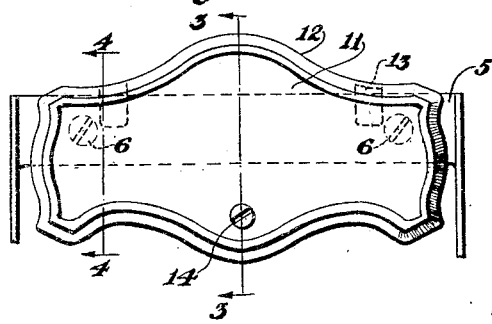
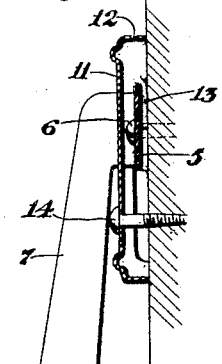
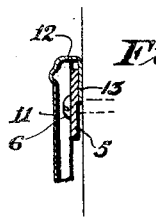
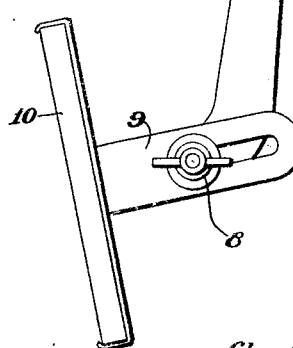
Inventor
Charles H. Oishei
by Barton A. Bean Jr.
Atty.

Patented Jan. 5, 1932

1,840,248

UNITED STATES PATENT OFFICE

CHARLES H. OISHEI, OF DETROIT, MICHIGAN, ASSIGNOR TO TRICO PRODUCTS CORPORATION, OF BUFFALO, NEW YORK

REAR VIEW MIRROR

Application filed July 26, 1926. Serial No. 124,871.

This invention relates to rear view mirrors for motor vehicles, and more particularly to the support of the mirror from the vehicle.

In view of the keen competition among the manufacturers of automobiles, the æsthetic qualities of automobiles have become of great moment and the interior finish of closed cars in particular has gained considerable importance as a selling factor for the vehicle. The several instruments on the instrument board are framed by enclosures, the design of each being in harmony with the lines of the vehicle as well as with each other. These harmonious trimmings of the interiors of closed cars have also extended to the different window and windshield controlling devices which are arranged off or away from the instrument board. At present, the rear view mirrors, by reason of their peculiar and bracket mountings, present more or less unsightly and incongruous spectacles in sharp contrast with the otherwise harmonious finished interior of the motor vehicle and detract much from the otherwise attractiveness of the car.

The object of the present invention is to provide a rear view mirror bracket which will harmonize with the interior finishings of the car and permit the manufacturer to attain that degree of excellence in the trim of the car which he has set out to accomplish.

The invention further has for an object to provide a harmonious cover plate for concealing the hitherto unsightly body portion of the mirror bracket and rendering such bracket in full accord with the remaining interior fixtures of the vehicle.

In the drawings,

Fig. 1 is an interior view of a motor vehicle of the closed car type, depicting more or less schematically the several instruments and controls in association with the improved mirror bracket, clearly showing the harmonious effect of the present invention.

Fig. 2 is an enlarged front elevation of the harmonious cover plate as applied to a rear view mirror bracket, the latter being shown in fragment.

Fig. 3 is a vertical cross sectional view on line 3—3 of Fig. 2, further disclosing the formation of the cover plate, and Fig. 4 is a similar view on line 4—4 of Fig. 2.

Referring more in detail to the accompanying drawings, the numeral 1 designates the instrument board of a closed car showing the several instruments enclosed in frames 2 of a harmonious design. The numeral 3 indicates the steering column bracket while the numeral 4 indicates the windshield control, both devices having a design in harmony with that of the frames 2. In the modern vehicle, this harmonious effect is carried out in the finish of the several instruments and controls within the car as well as without, as in the radiator and headlights, thereby producing a pleasing and æsthetic effect which weighs mightily in the offering of the vehicle to a prospective customer or purchaser.

In the mounting of rear view mirrors within the passenger compartment of closed cars, it is frequently necessary to lower the mirror to a plane at a considerable distance from its point of attachment to the vehicle so as to permit the driver or operator of the car to obtain his desired field of vision to the rear of the vehicle. Owing to this fact, it has been necessary to provide mirror supporting brackets with long depending arms from which the mirror is supported in a lower plane, thereby exposing the body portion of the bracket to the view of the passengers within the car. With the several instruments and controls within the car finished off in harmony, the bare bracket of the rear view mirror extends out in bold contrast, thereby accentuating its unsightliness and detracting more or less from the otherwise pleasing interior finish of the vehicle. The bracket comprises a bar-like body portion 5 which is attached to the vehicle above the windshield by a plurality of screws 6, and from the ends of the bar-like body portion 5 extend a pair of arms 7 which are suitably apertured or slotted for receiving the adjustment bolt 8 which also passes through the rearwardly extending arms 9 of the mirror plate or body 10 for permitting more or less universal adjustment of the mirror whereby the driver may obtain the desired field of vision to the rear. The body portion of the bracket, which is exposed to view above the mirror plate 10 consists of a strip of metal which has no beauty in itself, and therefore the cover plate 11 is superposed on this body portion so as to conceal the same and render the bracket as a whole, harmonious with the interior finish of the vehicle.

In the present invention, the cover plate is preferably stamped from sheet metal stock and finished in accordance with the design of the interior trim, and is provided with a strengthening marginal flange 12 extending thereabout. From the upper marginal portion of the cover plate extends a pair of lugs or hooks 13 which engage over the bar-like body portion 5 and extend down between the latter and the adjacent portion of the wall of the vehicle body. This simple means of attachment permits of the cover plate being readily positioned on the bracket after the latter has been securely fixed in position by the screws 6, the body portion of the bracket being preferably spaced from the adjacent wall of the vehicle body, as by sustaining spacers, or suitable spacing lugs (not shown) on the bracket body. The cover plate not only accords a finish to the bracket in full harmony with the general design carried out in the interior finishing of the vehicle, but conceals the bar-like body portion 5 as well as its attaching screws 6.

Suitable means may be provided for preventing unauthorized displacement, such means in the present instance consisting of a screw 14 which is passed through an aperture in the lower portion of the cover plate and directly into the wall of the vehicle body. This attaching screw securely holds the cover plate against vertical movement and consequently retains the lugs 13 in their operative position for securing the upper portion of the cover plate against outward vibration or movement. By polishing the head of the screw 14 in accordance with the finish of the cover plate, its appearance is merged into that of the plate itself and is, therefore, unobjectionable. In lieu of the attaching screw 14, the lower portion of the cover plate may be provided with a barbed point integral with the body plate and capable of being firmly embedded in the wall of the vehicle body.

As the cover plate is separate from the bracket, the bracket may be made from an unfinished or cheap grade of material which need not be finished at all. The same style of bracket may be used for different makes of automobiles and a cover plate provided for each make in harmony with the particular finish or design of that automobile, which cover plate may be readily positioned over the bracket so as to bring the bracket into full accord and harmony with the particular interior finish of the vehicle.

What is claimed is:

1. A rear view mirror comprising an attaching body portion and means extending therefrom for supporting a member in a position to expose the body portion, means extending through said body portion for attaching the same to a support, and a cover plate for concealing said body portion and said attaching means, said first means extending out beyond said cover plate for supporting said member and said cover plate having an attaching part extending behind said body portion for being secured between the body portion and the underlying portion of the support.

2. A rear view mirror comprising an attaching body portion and means extending therefrom for supporting a member, attaching means extending through said body portion for attaching the same to a support, an ornamental cover seated on the body portion and concealing the same and said attaching means while exposing said first means; said cover having a part hooking over said body portion, and a locking member passed through said cover and into a portion of the support for cooperating with said cover part in securing the cover in position.

3. A detachable cover member for a mirror supporting bracket with an exposed body portion, comprising a plate having upper and lower marginal flange portions for seating directly on the structure to which the body portion of the bracket is secured, said plate being adapted to overlie the body portion and having a positioning lug extending from one flange portion toward the other flange portion for interlocking with said body portion, said lug lying in the same plane with the structure-engaging edges of said upper and lower marginal flange portions, the end marginal portions of said plate being recessed to permit of engagement of said lug with said body portion.

4. A rear view mirror for automobiles including a supporting bracket consisting of an attaching body portion, a separable finishing cover plate for said body portion, an interlocking connection between said body portion and said cover plate, and a single means for securing said interlocking connection in place and for securing said cover plate directly to the vehicle.

5. In a rear view mirror for automotive equipment having an attaching portion, a cover plate for the attaching portion separate and distinct therefrom and seated directly thereon to conceal the same, said cover plate having spaced lugs engaged over and behind the attaching portion to support the cover plate thereon.

6. In a rear view mirror for automotive equipment having an attaching portion, a cover plate for the attaching portion separate and distinct therefrom and seated directly thereon to conceal the same, said cover plate having spaced lugs engaged over and behind the attaching portion to support the cover plate thereon, and means maintaining said lugs in engagement with said attaching portion.

7. An escutcheon plate for rear view mirror brackets having at one of its edges integrally formed ears bent downwardly to form a pocket between the plate proper and each of the ears, said pockets being adapted to receive a portion of the mirror bracket with which the escutcheon plate is to be associated, said escutcheon plate being further provided at the edge opposite the ears with an aperture adapted to receive means for preventing inadvertent disengagement of the ears.

8. An escutcheon plate for rear view mirror brackets having an encircling flange forming a compartment to accommodate the part of the mirror brackets which it is designed to conceal, means formed inwardly from the edge of said flange on one side of the plate for interlocking with the mirror brackets and removable means at the other side of the plate to cooperate with said first means for maintaining the interlocked relationship between the escutcheon plate and the mirror brackets with which it is associated.

CHARLES H. OISHEI.